(12) United States Patent
Ueda et al.

(10) Patent No.: US 8,950,920 B2
(45) Date of Patent: Feb. 10, 2015

(54) LIGHT REFLECTOR, AND PLANAR LIGHT SOURCE DEVICE AND ILLUMINATING DEVICE USING THE LIGHT REFLECTOR

(75) Inventors: Takahiko Ueda, Kamisu (JP); Hiroshi Koyama, Kamisu (JP)

(73) Assignee: Yupo Corporation, Tokyo (JP)

( * ) Notice: Subject to any disclaimer, the term of this patent is extended or adjusted under 35 U.S.C. 154(b) by 739 days.

(21) Appl. No.: 13/055,606

(22) PCT Filed: Mar. 10, 2009

(86) PCT No.: PCT/JP2009/054575
§ 371 (c)(1),
(2), (4) Date: Apr. 11, 2011

(87) PCT Pub. No.: WO2010/010729
PCT Pub. Date: Jan. 28, 2010

(65) Prior Publication Data
US 2011/0176299 A1    Jul. 21, 2011

(30) Foreign Application Priority Data

Jul. 24, 2008   (JP) ................................ 2008-190672

(51) Int. Cl.
*F21V 7/04* (2006.01)
*G09F 13/04* (2006.01)
*G09F 13/08* (2006.01)
(Continued)

(52) U.S. Cl.
CPC ............ *G02B 5/0866* (2013.01); *G02B 5/0247* (2013.01); *G02B 5/0284* (2013.01); *G09F 13/04* (2013.01); *G09F 13/14* (2013.01); *G02F 1/133605* (2013.01)

USPC .......... 362/609; 362/97.2; 362/623; 362/624; 362/625

(58) Field of Classification Search
CPC . G02B 6/0036; G02B 6/004; G02F 1/133553
USPC ........................ 362/97.1–97.4, 609, 623–626
See application file for complete search history.

(56) References Cited

U.S. PATENT DOCUMENTS

| | | | |
|---|---|---|---|
| 5,672,409 A | 9/1997 | Miyakawa et al. | |
| 5,710,856 A | 1/1998 | Ishii et al. | |

(Continued)

FOREIGN PATENT DOCUMENTS

| | | | |
|---|---|---|---|
| CN | 1672067 A | 9/2005 | |
| CN | 1809768 A | 7/2006 | |

(Continued)

OTHER PUBLICATIONS

Extended European Search Report issued Aug. 23, 2012 in European Patent Application No. 09800245.4.

(Continued)

*Primary Examiner* — David J Makiya
*Assistant Examiner* — Bryon T Gyllstrom
(74) *Attorney, Agent, or Firm* — Oblon, Spivak, McClelland, Maier & Neustadt, L.L.P.

(57) ABSTRACT

A light reflector including a multilayer film wherein the multilayer film includes a substrate layer and an emission line preventing layer including a scale-like light reflecting section, and the reflection angle light quantity ratio is from 1.5 to 6.5. The light reflector is capable of preventing generation of emission lines when it is incorporated in a planar light source device or an illuminating device.

12 Claims, 5 Drawing Sheets

(51) Int. Cl.
*G02B 5/08* (2006.01)
*G02B 5/02* (2006.01)
*G09F 13/14* (2006.01)
*G02F 1/1335* (2006.01)

(56) References Cited

U.S. PATENT DOCUMENTS

| | | | |
|---|---|---|---|
| 6,636,358 B2 * | 10/2003 | Umemoto et al. | 359/599 |
| 6,888,595 B2 * | 5/2005 | Umemoto | 349/113 |
| 7,298,438 B2 | 11/2007 | Ueda et al. | |
| 2002/0015299 A1 | 2/2002 | Koyama et al. | |
| 2002/0033916 A1 * | 3/2002 | Umemoto | 349/113 |
| 2002/0122146 A1 * | 9/2002 | Koyama et al. | 349/113 |
| 2003/0068466 A1 | 4/2003 | Mimura et al. | |
| 2004/0228146 A1 | 11/2004 | Koyama et al. | |
| 2004/0246415 A1 * | 12/2004 | Ueda et al. | 349/114 |
| 2005/0191464 A1 | 9/2005 | Takahashi et al. | |
| 2006/0056166 A1 * | 3/2006 | Yeo et al. | 362/19 |
| 2006/0158585 A1 | 7/2006 | Ueda et al. | |
| 2007/0014982 A1 | 1/2007 | Mimura et al. | |
| 2008/0043490 A1 * | 2/2008 | Coleman et al. | 362/623 |
| 2008/0130295 A1 * | 6/2008 | Ueda et al. | 362/346 |
| 2008/0259473 A1 * | 10/2008 | Ueda et al. | 359/839 |
| 2009/0262539 A1 * | 10/2009 | Ueda et al. | 362/296.02 |
| 2010/0026703 A1 * | 2/2010 | Parker et al. | 345/589 |

FOREIGN PATENT DOCUMENTS

| | | |
|---|---|---|
| JP | 4 239540 | 8/1992 |
| JP | 6 298957 | 10/1994 |
| JP | 8 262208 | 10/1996 |
| JP | 2002 31704 | 1/2002 |
| JP | 2002 90515 | 3/2002 |
| JP | 2002 258015 | 9/2002 |
| JP | 2003 176367 | 6/2003 |
| JP | 2003 207609 | 7/2003 |
| JP | 2004 151707 | 5/2004 |
| JP | 2004 309804 | 11/2004 |
| JP | 2005 31653 | 2/2005 |
| JP | 2005 99314 | 4/2005 |
| JP | 2005 202349 | 7/2005 |
| JP | 2006 18244 | 1/2006 |
| JP | 2006 195453 | 7/2006 |
| JP | 2008 3254 | 1/2008 |
| JP | 2008 146886 | 6/2008 |
| JP | 2008 158135 | 7/2008 |
| WO | 03 014778 | 2/2003 |

OTHER PUBLICATIONS

International Search Report Issued Jun. 16, 2009 in PCT/JP09/054575 filed Mar. 10, 2009.
Japanese Office Action issued Jan. 8, 2013 in Patent Application No. 2009-056769 with English Translation.
International Preliminary Report on Patentability and Written Opinion issued Feb. 3, 2011, in PCT/JP2009/054575 with English translation.
Office Action issued Apr. 2, 2013 in Chinese Application No. 200980128980.0 (With English Translation).
Notification of Third Office Action issued on Oct. 28, 2013, in corresponding Chinese application No. 200980128980.0 with English Translation.
Office Action issued Jun. 5, 2014 in Chinese Patent Application No. 200980128980.0 (with English translation).

* cited by examiner

LIGHT REFLECTOR, AND PLANAR LIGHT SOURCE DEVICE AND ILLUMINATING DEVICE USING THE LIGHT REFLECTOR

TECHNICAL FIELD

The present invention relates to a reflection plate and a reflector for use in planar light source devices, to a light reflector useful as a member for light reflection for use in various illuminating devices, and to a planar light source device and an illuminating device using the light reflector.

BACKGROUND ART

Backlight-type liquid-crystal displays, liquid-crystal TVs, illumination signboards and others with a built-in light source therein have been much popularized. Of such built-in light sources, a typical structure of an underlight-type backlight comprises, as in FIG. 2, a housing 11 that serves both as a profile case and as a light reflector, a diffuser 14, and a light source such as a cold-cathode lamp 15. A typical structure of a sidelight-type backlight comprises, as in FIG. 3, a light waveguide with a dot print 12 on a transparent acrylic plate 13, a light reflector 11, a diffuser 14, and a light source such as a cold-cathode lamp 15. In these, the light from the light source is reflected on the light reflector, and forms uniform planar light through the diffuser. With the recent tendency toward large-size displays, some improvements have been made in built-in light sources by increasing their output power and by increasing the number of the light source lamps therein. For increasing the brightness of these devices, plural light sources may be disposed, as in FIG. 2 and FIG. 3.

Heretofore for the light reflectors for such applications, the housing for the profile case is often painted white or a white polyester film (e.g., Patent Reference 1) is much used. However, the white painting could not satisfactorily increase the brightness by reflected light, and a light reflector that comprises a white polyester film is often problematic in point of its discoloration (yellowing) owing to the recent increase in the quantity of light, and materials that could secure high brightness are less discolored have become desired. Accordingly, recently, a high-brightness light reflector comprising a white polyolefin film that is discolored little has been proposed (e.g., Patent References 2 to 5).

However, when a conventional white polyester film or white polyolefin film is used in an underlight-type light source unit with plural light sources set therein for increasing the brightness thereof, it brings about a problem in that there appear emission lines and the brightness thereby becomes uneven. Specifically, in the case where plural light source lamps are installed, then the reflected light may gather owing to the light-reflecting property of the housing structure or the light reflector (white film), and, for example, as in FIG. 2, the brightness just above (adjacent to) the light source lamp may increase. Accordingly, a light reflector capable of preventing the brightness unevenness or the emission line generation to be caused by the localization of the reflected light is desired. The emission line that is discussed here does not mean the phenomenon that the area around the light source lamp has a partly increased brightness owing to the light leakage from the light source therearound.

Patent Reference 1: JP-A 4-239540
Patent Reference 2: JP-A 6-298957
Patent Reference 3: JP-A 2002-31704
Patent Reference 4: JP-A 8-262208
Patent Reference 5: WO03/014778

DISCLOSURE OF THE INVENTION

Problems that the Invention is to Solve

Accordingly, for the purpose of solving the problems in the related art, an object of the present invention is to provide a light reflector which is capable of preventing generation of emission lines when it is incorporated in a planar light source device or an illuminating device. In particular, it is an object of the invention to provide a light reflector which, even when incorporated in a backlight with, as installed therein, plural light sources (especially linear light sources, for example, linear light source lamps such as cold-cathode lamps, etc.), generates few emission lines. Specifically, the object of the invention is to realize a backlight free from the problem of brightness unevenness by providing a light reflector having a specific structure by itself not changing the structure of the apparatus of itself.

Means for Solving the Problems

The present inventors have assiduously studied and, as a result, have found that a light reflector of which the reflection angle light quantity ratio Q is controlled to fall within a specific range can solve the related art problems. Specifically, as the means for solving the problems, the following invention is herein provided.

The invention is a light reflector comprising a multilayer film wherein the multilayer film comprises a substrate layer (A) and an emission line preventing layer (B) comprising a scale-like light reflecting section, and the reflection angle light quantity ratio Q indicated by the following formula 1 is from 1.5 to 6.5:

$$\text{Reflection angle light quantity ratio } Q=Q2/Q1 \quad \text{(Formula 1)}$$

wherein Q1 and Q2 in the formula 1 each are indicated by the following formulae 2 and 3, respectively:

$$Q1=[U45-U15]/[\text{Tan}(45°)-\text{Tan}(15°)] \quad \text{(Formula 2)}$$

$$Q2=[U30-U15]/[\text{Tan}(30°)-\text{Tan}(15°)] \quad \text{(Formula 3)}$$

wherein U15, U30 and U45 in the formulae 2 and 3 each are indicated by the following formulae 4 to 6, respectively.

$$U15=S15 \times \text{Cos}^2(15°) \quad \text{(Formula 4)}$$

$$U30=S30 \times \text{Cos}^2(30°) \quad \text{(Formula 5)}$$

$$U45=S45 \times \text{Cos}^2(45°) \quad \text{(Formula 6)}$$

wherein S15, S30 and S45 in the formulae 4 to 6 each mean the light quantity value as measured, when a light is given from the light source arranged at a position spaced from the light reflector to the side of the emission line preventing layer (B) of the light reflector, at the position existing on the path of the light as regularly reflected at a reflection angle of 15°, 30° or 45°, respectively, from the light reflector and spaced from the light reflection point by the same distance.

Preferably, the aspect ratio of the scale-like light reflecting section is from 2 to 100 in any direction of the cross direction and the machine direction of the multilayer film.

Preferably, the multilayer film is a stretched multilayer film comprising a thermoplastic resin and a filler and stretched in an areal draw ratio of from 1.3 to 80 times.

Also preferably, the substrate layer (A) constituting the multilayer film is a resin film also comprising a thermoplastic resin and a filler, the filler concentration in the substrate layer (A) is from 5 to 75% by weight, and the filler is an inorganic filler having a mean particle size of from 0.05 to 1.5 μm and/or an organic filler having a mean dispersed particle size of from 0.05 to 1.5 μm. Also preferably, the emission line preventing layer (B) constituting the multilayer film comprises a thermoplastic resin and a filler, the filler concentration in the emission line preventing layer (B) is from 1 to 40% by weight, and the filler is an inorganic filler having a mean particle size of from 0.05 to 20 μm and/or an organic filler having a mean dispersed particle size of from 0.05 to 20 μm.

Preferably, the filler contained in the substrate layer (A) is a surface-treated inorganic filler, and the filler contained in the emission line preventing layer (B) is an inorganic filler having an aspect ratio of from 1 to 80.

Preferably, the thermoplastic resin is a polyolefin resin.

Preferably, the porosity, as indicated by the following formula 7, of the multilayer film is from 15 to 70%. Preferably, the light transmittance, as measured at a wavelength of 550 nm on the basis of JIS-Z-8722, of the multilayer film is from 0 to 2.5%.

$$\text{Porosity (\%)} = (\rho 0 - \rho)/\rho 0 \times 100 \quad \text{(Formula 7)}$$

wherein ρ0 in the formula 7 means the true density of the multilayer film, and ρ in the formula 7 means the density of the multilayer film.

The invention also includes a planar light source device and an illuminating device using the light reflector. Preferably, in the planar light source device and the illuminating device in which the light reflector of the invention is installed, the aspect ratio of the scale-like light reflecting section in the light reflector is from 2 to 100 in the cross section cut in any direction parallel to or perpendicular to the linear light source.

Advantage of the Invention

When incorporated in various planar light source devices heretofore employed in the art, the light reflector of the invention can prevent the generation of brightness unevenness to be caused of emission lines. In particular, not depending on the structure or the constitution peculiar to different planar light source devices such as the number of the light sources, the housing profile, the member installation position and the like, the light reflector makes it possible to provide a planar light source device generating few emission lines.

When the light reflector of the invention is used as the member for light reflection in illuminating devices, it is useful as causing little halation though having a high reflectivity.

BRIEF DESCRIPTION OF THE DRAWINGS

In the drawings, 1 is a substrate layer (A), 2 is an emission line preventing layer (B), 3 is a property regulating layer (C), 4 is a scale-like light reflecting section, 11 is a light reflector (housing), 12 is a white dot print for reflection, 13 is an acrylic plate (light guide plate), 14 is a diffuser, 15 is a cold cathode lamp, 16 is a photoreceiver.

BEST MODE FOR CARRYING OUT THE INVENTION

The constitution and the effect of the light reflector of the invention are described in detail hereinunder. The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

[Substrate Layer (A)]

The substrate layer (A) constituting the light reflector of the invention acts to support the emission line preventing layer (B) and also acts reflect almost all the light having passed through the emission line preventing layer (B) in the incident direction (to the side of the emission line preventing layer) to thereby prevent the light from running through the light reflector and to thereby increase the light reflectivity of the light reflector, consequently realizing a high-brightness built-in light source.

More concretely, the substrate layer includes a metal plate, a film having a thin metal film, a multilayer film prepared by alternately laminating at least two different types of resins each having a different angle of refraction, a film having a large number of internal pores, etc. Above all, preferred is a thermoplastic resin film having a large number of internal pores. The film can efficiently reflect the incident light at the interface (resin/air) of the large number of pores therein. The present inventors have already found that, when a large number of fine pores each having nearly the same size as that of the wavelength of the intended light are made to exist inside the film, then a light reflector having a high light reflectivity can be obtained. However, the tendency of the simple body of the film alone to diffusively reflect light is great, and therefore the film alone is unsatisfactory in point of improving emission lines as described in the section of the related art.

Thermoplastic Resin:

The thermoplastic resin for use for the substrate layer (A) in the invention is for forming the matrix of the substrate layer (A), and its type is not specifically defined. The thermoplastic resin (A) for use for the substrate film includes polyolefinic resins such as ethylenic resins (such as high-density polyethylene, middle-density polyethylene, low-density polyethylene, etc.), propylenic resins, polymethyl-1-pentene, ethylene-cyclic olefin copolymer, etc.; polyamide resins such as nylon-6, nylon-6,6, nylon-6,10, nylon-6,12, etc.; thermoplastic polyester resins such as polyethylene terephthalate and its copolymer, polyethylene naphthalate, aliphatic polyester, etc.; and other thermoplastic resins such as polycarbonate, atactic polystyrene, syndiotactic polystyrene, polyphenylene sulfide, etc. Two or more of these may be used as combined.

Of those, preferred is use of polyolefinic resins from the viewpoint that they are free from discoloration (yellowing) by the light from light source and are excellent in chemical resistance and production cost. More preferred is use of propylenic resins.

The propylenic resins include propylene homopolymers, and propylene-based copolymers with α-olefin such as ethylene, 1-butene, 1-hexene, 1-heptene, 4-methyl-1-pentene, etc. The stereospecificity of the resins is not specifically defined. The resins may be isotactic or syndiotactic, and may have any desired degree of stereospecificity. The copolymers may be binary, ternary or quaternary ones, and may be random copolymers or block copolymers.

Preferably, the content of the thermoplastic resin in the substrate layer (A) is from 25 to 95% by weight, more preferably from 35 to 90% by weight, even more preferably from 45 to 85% by weight. When the content of the thermoplastic resin in the substrate layer (A) is at least 25% by weight, then the layer may readily have sufficient strength for the support and may tend to be hardly broken while the multilayer film is stretched and shaped. When the content is at most 95% by weight, then the film may have sufficient pores and may tend to readily realize high reflectivity.

Filler:

Preferably, the substrate layer (A) in the invention contains a filler mainly for the purpose of forming pores therein. The filler that may be in the substrate layer (A) along with the thermoplastic resin therein includes various inorganic fillers and/or organic fillers.

The inorganic filler includes heavy calcium carbonate, precipitated calcium carbonate, calcined clay, talc, titanium oxide, barium sulfate, aluminium sulfate, silica, zinc oxide, magnesium oxide, diatomaceous earth, etc. In addition, those inorganic fillers processed with various surface-treating agents are also usable herein. Above all, heavy calcium carbonate, precipitated calcium carbonate, clay, diatomaceous earth and their surface-treated products preferred as they are inexpensive and facilitate the formation of pores in stretching. More preferred are heavy calcium carbonate and precipitated calcium carbonate that have been processed with various surface-treating agents.

As the surface-treating agents, for example, preferred are resin acids, fatty acids, organic acids, sulfuric ester-type anionic surfactants, sulfonic acid-type anionic surfactants, petroleum resin acids, their sodium, potassium or ammonium salts, and their fatty acid esters, resin acid esters, wax, paraffin, etc. Also preferred are nonionic surfactants, dienic polymers, titanate-type coupling agents, silane-type coupling agents, phosphate-type coupling agents, etc. The sulfuric ester-type anionic surfactants are, for example, long-chain alcohol sulfuric esters, polyoxyethylene alkyl ether sulfuric esters, sulfurized oils, and their sodium or potassium salts, etc. The sulfonic acid-type anionic surfactants are, for example, alkylbenzenesulfonic acids, alkylnaphthalene sulfonic acids, paraffin sulfonic acids, α-olefinsulfonic acids, alkylsulfosuccinic acids, and their sodium or potassium salts, etc. The fatty acids are, for example, caproic acid, caprylic acid, pelargonic acid, capric acid, undecanoic acid, lauric acid, myristic acid, palmitic acid, stearic acid, behenic acid, oleic acid, linolic acid, linolenic acid, eleostearic acid, etc.; the organic acids are, for example, maleic acid, sorbic acid, etc.; the dienic polymers are, for example, polybutadiene, isoprene, etc.; the nonionic surfactants are polyethylene glycol ester-type surfactants, etc. One of these surface-treating agents may be selected and used alone, or two or more may be selected and used as combined. Methods for processing inorganic fillers with these surface-treating agents are described, for example, in JP-A 5-43815, 5-139728, 7-300568, 10-176079, 11-256144, 11-349846, 2001-158863, 2002-220547, 2002-363443, and these are usable herein.

The organic filler for use herein may have a melting point or a glass transition point (e.g., 120 to 300° C.) higher than the melting point or the glass transition point of the thermoplastic resin. For example, when the thermoplastic resin is a polyolefinic resin, the organic filler may be polyethylene terephthalate, polybutylene terephthalate, polyamide, polycarbonate, polyethylene naphthalate, polystyrene, melamine resin, cyclic olefin homopolymer, copolymer of cyclic olefin and ethylene, polyethylene sulfide, polyimide, polyethyl ether ketone, polyphenylene sulfide, etc. Above all, preferred are organic fillers having a melting point or a glass transition point higher than that of the polyolefinic resin to be used and immiscible with the resin from the viewpoint of the pore formation.

One of the inorganic filler or the organic filler may be selected and used singly in the substrate layer (A); or two or more may be selected and used as combined. In the case where two or more are combined and used, then the inorganic filler and the organic filler may be mixed and used.

For controlling the amount of the pores to be formed by stretching and shaping the multilayer film as mentioned below, the filler content in the substrate layer (A) is preferably from 5 to 75% by weight, more preferably from 10 to 70% by weight. For example, the filler content may be from 15 to 50% by weight, and may be from 18 to 42% by weight. When the filler content is at least 5% by weight, then sufficient pores may tend to be formed; and when the filler content is at most 75% by weight, the support may readily have sufficient strength and therefore the multilayer film may be prevented from being cut or broken during stretching and shaping.

For suitably controlling the size of the pores to be formed in stretching and shaping the multilayer film as mentioned below, the mean particle size of the inorganic filler and the mean dispersed particle size of the organic filler for use in the substrate layer (A) each are preferably from 0.05 to 1.5 µm, more preferably from 0.1 to 1 µm. When the filler having a mean particle size or a mean diffused particle size of at least 0.05 µm is used, then the desired pores may be readily formed. When the filler having a mean particle size or a mean dispersed particle size of at most 1.5 µm is used, then the pore size may be more uniform to realize high reflectivity with ease.

The mean particle size of the inorganic filler for use in the invention may be determined, for example, through measurement of the particle size corresponding to cumulative 50% data as measured by the use of a laser diffractometric particle sizer, "Microtrack" (trade name by Nikkiso) (cumulative 50% particle size), or through primary particle size observation with an electronic microscope (for example, the mean value of the data of 100 particles is taken as the mean particle size), or through specific surface area-based computation (for example, the specific surface area is measured with a powder specific area meter, Shimadzu's SS-100, and the particle size is computed from the data). In the invention, 100 primary particles of the inorganic filler are observed with an electronic microscope, the particle size (major diameter) of each particle is measured, and the data are averaged to give the mean particle size.

The mean dispersed particle size of the organic filler for use in the invention may be determined, for example, as follows. The organic filler is dispersed in a thermoplastic resin by melt-kneading, and in the cross section of the resin film, at least 10 dispersed particles are observed with an electronic microscope. The particle size (major diameter) of each particle is measured, and the data are averaged to give the mean particle size.

Other Ingredients:

In the case where the main resin to constitute the substrate layer (A) is a propylenic resin, a resin having a lower melting point than that of the propylenic resin, such as polyethylene, ethylene-vinyl acetate or the like may be added thereto in an amount of from 3 to 25% by weight, for the purpose of improving the stretchability of the layer.

If desired, various known additives such as fluorescent brightener, heat stabilizer, antioxidant, UV stabilizer (light stabilizer), UV absorbent, dye, pigment, antistatic agent, dispersant, lubricant, antiblocking agent, flame retardant, plasticizer, nucleating agent and the like may be added to the substrate layer (A). Preferably, these are added within a range not overstepping the scope and the spirit of the invention.

The heat stabilizer may be a steric-hindered phenol-type, or phosphorus-containing, or amine-type stabilizer, and its amount is preferably from 0.001 to 1% by weight of the layer. The UV stabilizer (light stabilizer) may be a steric-hindered amine-type, or benzotriazole-type, or benzophenone-type light stabilizer, and its amount may be from 0.001 to 1% by weight of the layer. The inorganic filler dispersant may be a silane-coupling agent, a higher fatty acid such as oleic acid or stearic acid, a metal soap, a polyacrylic acid, a polymethacrylic acid or their salt or the like, and its amount may be from 0.01 to 4% by weight of the layer.

The substrate layer (A) in the invention may have a single-layer structure, or may have a multilayer structure composed of layers differing in composition. Preferably, the thickness of the substrate layer (A) is from 30 to 1000 μm, more preferably from 100 to 600 μm, even more preferably from 150 to 300 μm, still more preferably from 180 to 270 μm.

[Emission Line Preventing Layer (B)]

The emission line preventing layer (B) constituting the light reflector of the invention is positioned as the outermost layer and serves as the light-reflective face of the light reflector; and as combined with the substrate layer (A), the layer functions for light reflection, and in particular, the layer functions to prevent emission lines in a planar light source (built-in light source). The emission line preventing layer (B) contains a scale-like light reflecting section inside it, and characterizes the light reflector so that the sum total of the reflected light from each light source could be the largest at the position of a reflection angle of 30°. As a result, a built-in light source free from a problem of emission lines can be realized.

Like the substrate layer (A), the emission line preventing layer (B) is also preferably a film having a large number of fine pores inside it. More concretely, preferred is a film containing a thermoplastic resin and a filler and having pores inside it, in which the pore corresponds to the scale-like light reflecting section.

The aspect ratio of the scale-like light reflecting section contained in the emission line preventing layer (B) is preferably from 2 to 100 in any direction of the cross direction and the machine direction of the multilayer film, more preferably from 4 to 70, even more preferably from 10 to 36. The aspect ratio in the cross direction means the mean value of the aspect ratio (length in the cross direction (maximum diameter)/length in the thickness direction (minimum diameter)) of 10 scale-like light reflecting sections observed in the cross section cut vertically in the thickness direction parallel to the cross direction of the multilayer film, using an electronic microscope. The aspect ratio in the machine direction means the mean value of the aspect ratio (length in the machine direction (maximum diameter)/length in the thickness direction (minimum diameter)) of 10 scale-like light reflecting sections observed in the cross section cut vertically in the thickness direction parallel to the machine direction of the multilayer film, using an electronic microscope. The machine direction means, when the multilayer film is a rolled film or a rectangular film, the lengthwise direction of the film, and the cross direction means the direction perpendicular to the machine direction. When the multilayer film is a square film, the machine direction may be considered as the direction parallel to one side of the film, and the cross direction may be as the direction perpendicular to the machine direction.

Thermoplastic Resin:

The same thermoplastic resin as in the substrate layer (A) may be used in the emission line preventing layer (B) in the invention. As in the substrate layer (A), preferred is use of polyolefinic resins from the viewpoint that they are free from discoloration (yellowing) by the light from light source and are excellent in chemical resistance and production cost. More preferred is use of propylenic resins.

Filler:

The same filler as in the substrate layer (A) may also be incorporated in the emission line preventing layer (B) in the invention, and in addition, other inorganic fillers are further applicable to the layer, including talc, surface-treated talc, kaolin, surface-treated kaolin, kaolinite, halloysite, sericite, mica, surface-treated mica such as pearl mica, as well as tabular mica, tabular alumina, tabular calcium carbonate, tabular titanium dioxide, tabular titanic acid, tabular iron oxide, tabular zinc oxide, smectite group mineral such as montmorillonite, as well as graphite, and other scale-like inorganic fillers such as glass flakes, etc. Various inorganic salts are employable as the surface-treating agent. So-called pearly pigments of surface-treated kaolin or mica are available as commercial products by Merck and Engelhard.

For effectively forming the scale-like light reflecting section in the emission line preventing layer (B) in the invention, preferred is use of a scale-like inorganic filler. Concretely, the aspect ratio (major diameter/minor diameter) of the inorganic filler is from 1 to 80, more preferably from 1.5 to 55, even more preferably from 3 to 30. The aspect ratio of the scale-like inorganic filler is a value computed by observing 10 inorganic fillers with an electronic microscope, and averaging the found data thereof. In particular, in obtaining the aspect ratio of the scale-like inorganic filler, for strictly measuring the major diameter and the minor diameter thereof, it is desirable that the inorganic filler is dispersed in the emission line preventing layer (B), then the emission line preventing layer (B) is stretched, and while the inorganic filler therein is kept aligned in the stretching direction, the cross section cut in the thickness direction of the emission line preventing layer (B) is observed with an electronic microscope, and the major diameter (diameter in the stretching direction) of the inorganic filler seen inside the layer and the minor diameter (diameter in the thickness direction) thereof are measured.

Preferably, the content of the filler in the emission line preventing layer (B) is within a range of from 1 to 40% by weight, more preferably from 2 to 20% by weight. When the filler content is at least 1% by weight, then the desired scale-like light reflecting section may be easy to form. When the filler content is at most 40% by weight, then the pores do not communicate with each other, and more uniform scale-like light reflecting sections may be easy to form, therefore enabling more efficient emission line prevention.

Preferably, the mean particle size of the inorganic filler for use in the emission line preventing layer (B) is from 0.05 to 20 μm, more preferably from 0.5 to 18 μm, even more preferably from 5 to 15 µm. When the filler having a mean particle size of at least 0.05 µm is used, then the scale-like light reflecting section may be easy to form, therefore more effectively preventing emission lines. When the filler having a particle size of at most 15 µm is used, then the multilayer film surface may have high strength and would be hardly scratched, in which the filler may hardly drop off.

Other Ingredients:

If desired, any other ingredient like in the substrate layer (A) may also be incorporated in the emission line preventing layer (B) in the invention.

The thickness of the emission line preventing layer (B) is preferably from 0.5 to 100 µm, more preferably from 2 to 70 µm, even more preferably from 5 to 50 µm. When the thickness is at least 0.5 µm, then the film may exhibit a sufficient emission line preventing effect. When the thickness is at most 100 µm, then the layer may hardly detract from the reflective capability of the substrate layer (A) and may therefore prevent the reduction in the reflectivity of the multilayer film.

Effect of Scale-Like Light Reflecting Section:

The scale-like light reflecting section to be provided inside the emission line preventing layer (B) acts to control a part of the incident light into the emission line preventing layer (B) so as to run toward the plane direction of the layer when the multilayer film is used as a light reflector. Though the mechanism thereof is not strictly clarified, it is at present presumed that the section would have the following effect.

Specifically, the scale-like light reflecting section having a high aspect ratio is a disc-shaped hollow cavity having a gently curved surface like the lens of a magnifier or like a dorayaki (a type of Japanese confection which consists of two small pancake-like patties made from sponge cake wrapped around a filling of sweet red bean paste). The scale-like light reflecting section is preferably isotropic, or that is, circular, when it is seen from its top (or that is, when the light reflector is looked down at its surface).

The scale-like light reflecting section acts as a convex lens or a convex mirror for the incident light running into the emission line preventing layer (B) from the outside. Reflected on the surface of the convex lens (interface) or reflected on the surface of the convex mirror (interface), the incident light could be controlled to run gently toward the plane direction of the layer.

As a result, it is presumed that the incident light running into the multilayer film in an oblique direction thereto from each light source would be reflected in the condition as somewhat shifted in the plane direction rather than being regularly reflected (as specular reflection), and the sum total of the reflected light could be so controlled as to be large at the position of the reflection angle of 30°, therefore bringing about the intended emission line preventing effect.

[Multilayer Film]

Forming Method:

The emission line preventing layer (B) may be formed on one surface alone of the substrate layer (A) or may be formed on both surfaces thereof.

In the case where both the substrate layer (A) and the emission line preventing layer (B) are resin films, employable for laminating the two layers are a method of coextrusion of the starting melts for the substrate layer (A) and the emission line preventing layer (B), using a multilayer T-die or I-die to which at least two extruders are connected and laminating the melts inside the die; a method comprising first forming the substrate layer (A), then extruding thereon the starting melt for the emission line preventing layer (B) directly or via an easy adhesion layer, and sticking (melt laminating) it to the substrate layer (A); a method comprising separately forming the substrate layer (A) and the emission line preventing layer (B) and sticking (dry laminating) the two via an adhesive layer, etc.

Though not illustrated in detail in the invention, in the case where the emission line preventing layer (B) is formed as a coating layer that comprises a binder resin and a filler, there may also be employed a method of directly applying the composition for the layer (B) onto the substrate layer (A).

For stretching the multilayer film, employable is any ordinary monoaxially-stretching or biaxially-stretching method. Concretely, herein employable is a monoaxial-stretching method that comprises sheetwise extruding resin melts through a single-layer or multi-layer T-die or I-die connected to a screw extruder, and then monoaxially stretching the resulting sheet in a mode of machine-direction stretching to be attained by utilizing the peripheral speed difference between multiple rolls; or a successive biaxial-stretching method that comprises a combination of the same step as in the monoaxial-stretching method and an additional step of laterally stretching to be attained in a tenter oven; a monoaxial-stretching method of laterally stretching the sheet in a tenter oven; a simultaneous biaxial-stretching method of stretching the sheet according to a combination of a tenter oven and a linear motor; a simultaneous biaxial-stretching method of stretching the sheet according to a combination of a tenter oven and a pantograph; a simultaneous biaxial-stretching method comprising cutting the film into flat sheets and simultaneously biaxially-stretching each sheet with a pantograph-type stretcher. For forming the disc-shaped scale-like light reflecting section, preferably, the emission line preventing layer (B) is stretched biaxially; and for forming the isotropic scale-like light reflecting section, preferably, the draw ratio in stretching at every stretching axis is nearly the same, and more preferred is a simultaneous biaxial-stretching method.

Specifically, the multilayer film in the invention may be formed according to combination of the above-mentioned lamination method and stretching method, and the forming method is not specifically defined. For example, the coextruded sheet of the substrate layer (A) and the emission line preventing layer (B) may be monoaxially stretched by the use of multiple rolls each running at a different peripheral speed; or the sheet may be further successively biaxially stretched by the use of a tenter oven. The coextruded sheet may be simultaneously biaxially stretched by the use of a pantograph-type stretcher. Another method is also employable in which the sheet formed by extruding the starting melt of the substrate layer (A) is monoaxially stretched in the machine direction by the use of multiple rolls each running at a different peripheral speed, then the starting melt of the emission line preventing layer (B) is directly extruded onto the substrate layer (A) and sticking (laminating) them to give a laminate and the laminate is led into a tenter oven and monoaxially stretched in the lateral direction thereon, thereby giving a multilayer film in which the number of the stretching axis of each layer differs.

The stretching temperature may be lower by 2 to 60° C. than the melting point of the thermoplastic resin used, but is higher by 2 to 60° C. than the glass transition point of the resin. When the resin is propylene homopolymer (melting point, 155 to 167° C.), then the stretching temperature preferably falls between 95 and 165° C. When the resin is polyethylene terephthalate (glass transition point: about 70° C.), then the stretching temperature preferably falls between 100 and 130° C. The pulling rate for the stretching preferably falls between 20 and 350 m/min.

Thus formed, the multilayer film may be optionally heat-treated (annealed) for promoting the crystallization thereof and for reducing the thermal shrinkage of the multilayer film.

For suitably controlling the size of the pores to be formed in the multilayer film, and in the substrate layer (A) and the emission line preventing layer (B) constituting the film, the areal draw ratio in stretching each layer preferably falls between 1.3 and 80 times, more preferably between 7 and 70 times, even more preferably between 22 and 65 times, most preferably between 25 and 60 times. For example, the areal draw ratio may be from 27 to 50 times, or from 30 to 45 times, or from 33 to 42 times, or from 35 to 40 times. The areal draw ratio falling between 1.3 and 80 times may readily form fine pores in the film, not lowering the reflectivity of the film, and may therefore markedly enhance the emission line preventing effect of the film.

For suitably controlling the amount per unit volume of the pores to be formed in the multilayer film in the invention, the porosity is preferably from 15 to 70%, more preferably from 20 to 55%. For example, the porosity may be from 30 to 54%, or from 38 to 54%. In this description, the "porosity" is a value to be computed according the above-mentioned formula 7. In the formula 7, $\rho 0$ means the true density of the multilayer film, and $\rho$ means the density of the multilayer film (JIS-P8118). So far as the unstretched material does not contain much air, the true density is nearly equal to the density of the unstretched film. The porosity of at least 15% may readily secure sufficient reflectivity; and the porosity of at most 70% may facilitate uniform pore formation and stable stretching and shaping.

Even when the multilayer film in the invention is formed according to any forming method, the true density $\rho 0$ of the multilayer film may be known from the true density of each of the substrate layer (A) and the emission line preventing layer (B) constituting the film; and when the ratio of the two layers (for example, the weight ratio of the two) is known, then the true density of the film may be determined through computation. The density $\rho$ of the multilayer film may be measured; and from those data, the porosity of the laminate film can be computed according to the above-mentioned formula 7.

The density $\rho$ of the multilayer film in the invention generally falls between 0.5 and 1.2 g/cm$^3$. Films having more pores have a smaller density and have a larger porosity. Films having a larger porosity may have improved surface-reflecting characteristics. However, the presence of a small amount of coarse pores may be ineffective for increasing the reflectivity of the film; and ideally, therefore, preferred is the film having a large number of fine pores and having a large porosity. When the porosity thereof is too large, then the strength of the multilayer film may lower, and the handlability of the film in installing it in planar light source devices would worsen.

The total light transmittance T, as measured at a wavelength of 550 nm based on JIS-Z-8722, of the thus-produced multilayer film for use in the invention is preferably from 0 to 2.5%, more preferably from 0 to 2%. When the total light transmittance T is at most 2.5%, then the reduction in the reflectivity (total light reflectivity) owing to light breakthrough can be readily prevented, therefore readily increasing the brightness of built-in planar light source devices.

[Light Reflector]

Figure 1:
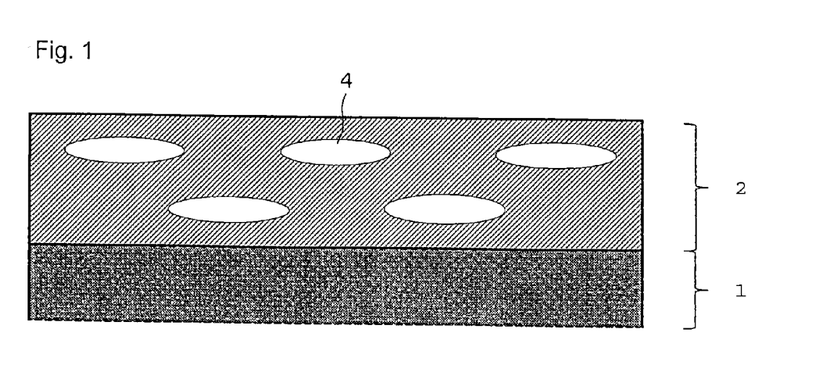
FIG. 1 is a cross-sectional view showing one embodiment of the constitution of the light reflector of the invention.

The light reflector of the invention is characterized by including a multilayer film that comprises a substrate layer (A) and an emission line preventing layer (B) including a scale-like light reflecting section, as in FIG. 1. The light reflector of the invention may be so designed that the emission line preventing layer (B) is laminated on one surface of the substrate layer (A), or the emission line preventing layer (B) is laminated on both surfaces of the substrate layer (A). Any other layer may be further added to the multilayer film. For example, the film may have a property regulating layer (C) on the substrate layer (A) on the side thereof opposite to the side having the emission line preventing layer (B), or between the substrate layer (A) and the emission line preventing layer (B). Examples of the constitution of the light reflector of the invention include (B)/(A), (B)/(A)/(B), (B)/(A)/(C), (B)/(C)/(A), (B)/(C)/(A)/(B), (B)/(C)/(A)/(C), (B)/(C)/(A)/(C)/(B), etc.

Property Regulating Layer (C):

The property regulating layer (C) is provided for the purpose of making the light reflector have other necessary properties, for example, mechanical strength such as bending elasticity, as well as dimensional stability and the like. In the case where the layer is provided between the substrate layer (A) and the emission line preventing layer (B), the layer may be an adhesive layer or a primer layer for increasing the adhesion strength. Not overstepping the scope and the spirit of the light reflector of the invention, the layer may give properties of heat resistance, antimagnetic capability, contamination resistance, electroconductivity, masking capability, etc.

In the property regulating layer (C), usable is the same thermoplastic resin as in the substrate layer (A). The layer may contain or may not contain the above-mentioned filler. The filler content may be generally from 0 to 20% by weight, preferably from 0 to 10% by weight, more preferably from 0 to 5% by weight, even more preferably from 0 to 3% by weight.

For forming the property regulating layer (C), employable is, like that for forming the substrate layer (A), a method of coextrusion of the starting melt for the property regulating layer (C), using a multilayer T-die or I-die, before stretching and shaping, followed by stretching and shaping the obtained laminate; when the substrate layer (A) is biaxially stretched, a method of extruding the starting melt for the property regulating layer (C) and sticking it thereto after monoaxial stretching of the layer (A), followed by monoaxially stretching the resulting laminate; a method of forming the substrate layer (A) by stretching and shaping, then extruding the starting resin for the property regulating layer (C) and sticking it thereto directly or via an easy adhesion layer; or a method of forming the property regulating layer (C) by coating on the substrate layer (A).

If desired, any other ingredient as in the substrate layer (A) may be similarly incorporated in the property regulating layer (C) in the invention.

The thickness of the property regulating layer (C) is preferably at least 1 μm, more preferably from 2 to 30 μm, even more preferably from 3 to 20 μm. When the thickness is at least 1 μm, then the layer may improve the mechanical strength and the workability of the light reflector.

Emission Line Improving Effect in the Invention:

It is considered that, in the light reflector of the invention, the incident light running into the multilayer film in an oblique direction thereto from each light source would be reflected in the condition as somewhat shifted by the scale-like light reflecting section toward the plane direction rather than being regularly reflected (as specular reflection for which the incident angle and the reflection angle are the same), and the sum total of the reflected light from each light source could be controlled to be large.

Figure 4:
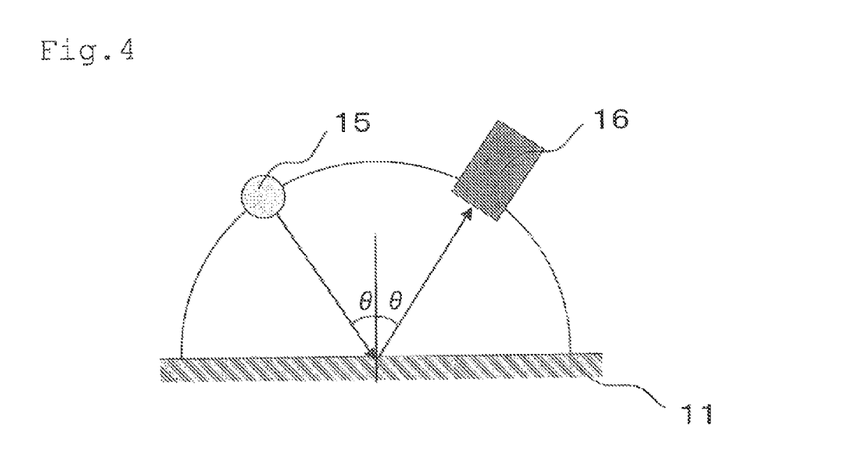
FIG. 4 is an outline view for measurement of Sθ value with a goniophotometer.

For quantitatively expressing this, the reflection angle light quantity ratio Q represented by the above formula 1 is used as the index of the reflected light distribution of the light reflector of the invention. The reflection angle light quantity ratio Q can be determined through computation after measurement of the light quantity value S15, S30 and S45 of the light reflector, using the goniophotometer. The goniophotometer is, as shown in FIG. 4, so designed that the light quantity can be measured by freely varying the incident angle and the reflection angle while the distance between the light source and the reflection point as well as the distance between the reflection pint and the photoreceiver is kept constant.

Figure 5:
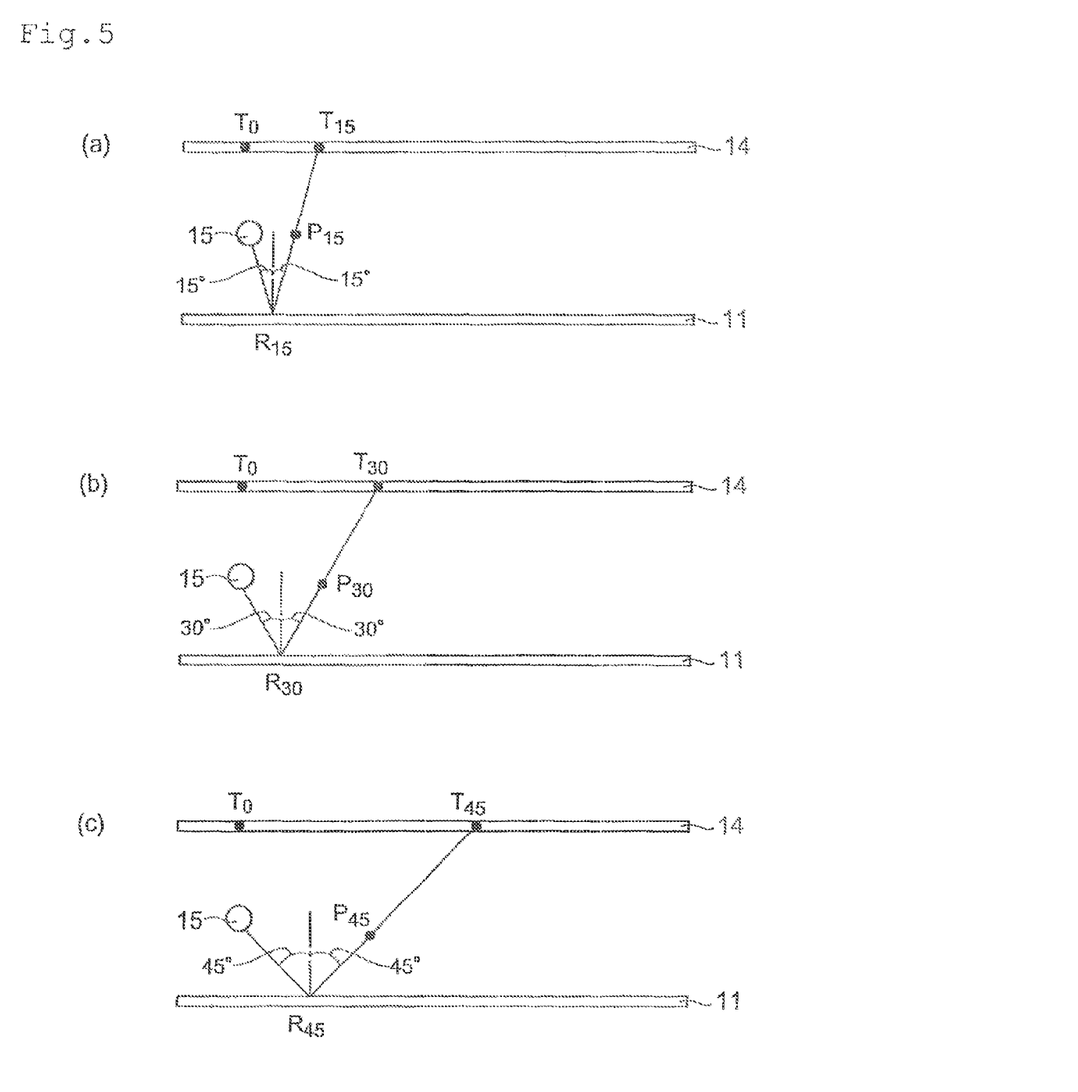
FIG. 5 is a view for explaining the light quantity measurement position and the reflected light path in the invention.

S15, S30 and S45 each mean the light quantity value as measured, when a light is given from the light source arranged at a position spaced from the light reflector to the side of the emission line preventing layer (B) of the light reflector, at the position existing on the path of the light as regularly reflected at a reflection angle of 15°, 30° or 45°, respectively, from the light reflector and spaced from the light reflection point by a specific distance. FIG. 5(a) shows the path of light as regularly reflected at an incident angle and a reflection angle of 15° from the light source; FIG. 5(b) shows the path of light as regularly reflected at an incident angle and a reflection angle of 30° from the light source; and FIG. 5(c) shows the path of light as regularly reflected at an incident angle and a reflection angle of 45° from the light source. In this, all the three distances, the distance between the light reflection point R15 of the light regularly reflected at the reflection angle 15° and the position P15 at which the light quantity S15 is measured, the distance between the light reflection point R30 of the light regularly reflected at the reflection angle 30° and the position P30 at which the light quantity S30 is measured, and the distance between the light reflection point R45 of the light regularly reflected at the reflection angle 45° and the position P45 at which the light quantity S45 is measured, are made to be the same. When the three distances are the same, the distance fluctuation does not have any influence on the computation to determine the value Q. S15, S30 and S45 can be determined using a goniophotometer. In the invention, the reflection angle means the angle between the direction of the light emitted by the light source and reflected on the light reflector and the vertical line to the surface of the light reflector. In the invention, the incident angle means the angle between the direction of the light emitted by the light source and reached the light reflector and the vertical line to the surface of the light reflector.

Based on the found data S15, S30 and S45 and according to the formulae 4 to 6, U15, U30 and U45 can be obtained. U15, U30 and U45 each indicate the light quantity at the intersection point between the path of the light regularly reflected at the reflection angle 15°, 30° or 45° from the light reflector and the diffuser. Concretely, they each indicate the light quantity at the position of T15, T30 or T45, respectively, in FIG. 5. Light has the property of attenuating in proportion to the square of the distance, and therefore, U15, U30 and U45 can be given by multiplying S15, S30 or S45, respectively, by $\cos^2(\theta)$, as indicated by the formulae 4 to 6 ($\theta$ means the reflection angle).

Figure 6:
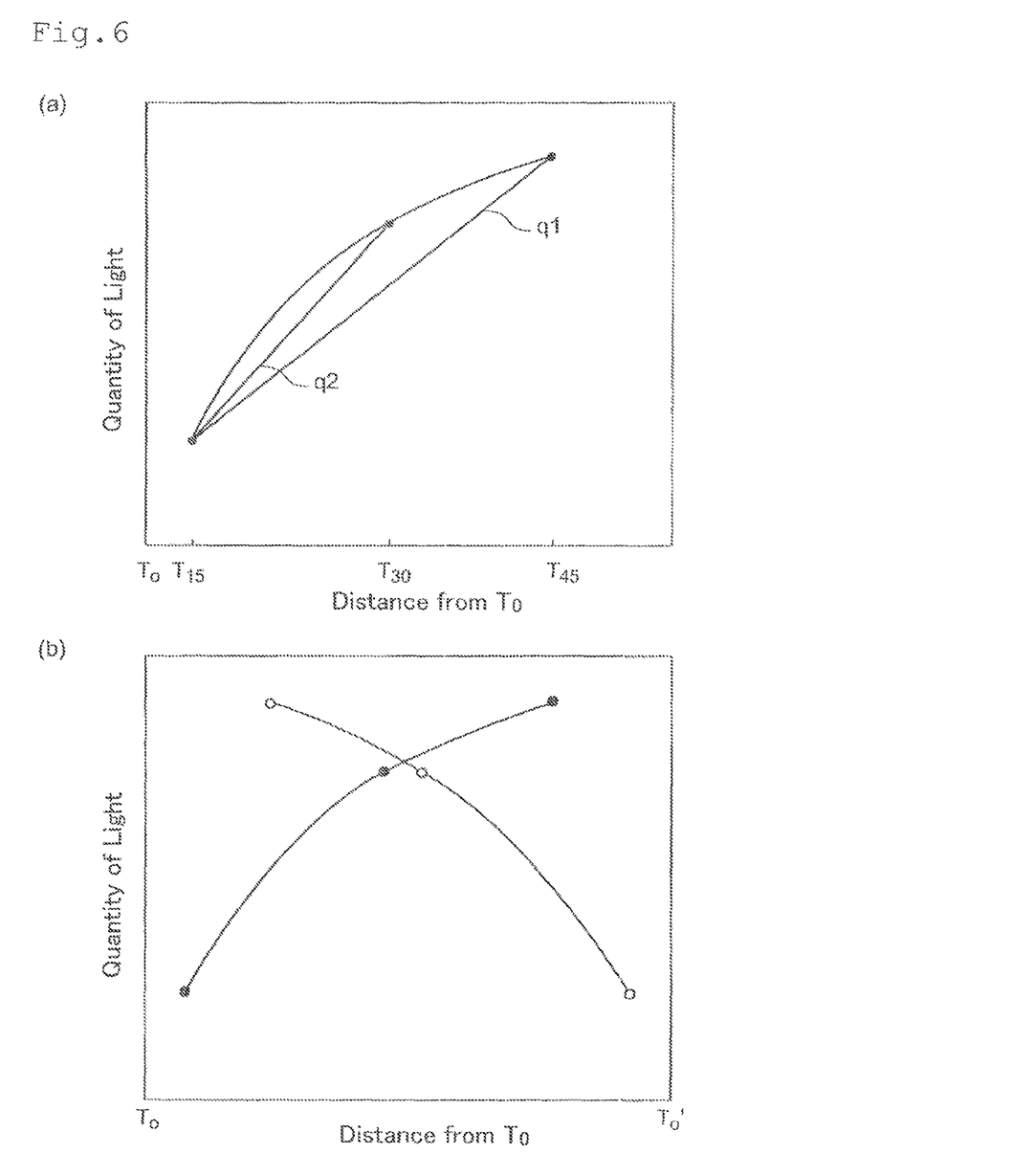
FIG. 6 is a view showing one embodiment of the light quantity distribution of the reflected light from the light reflector of the invention.
Figure 7:
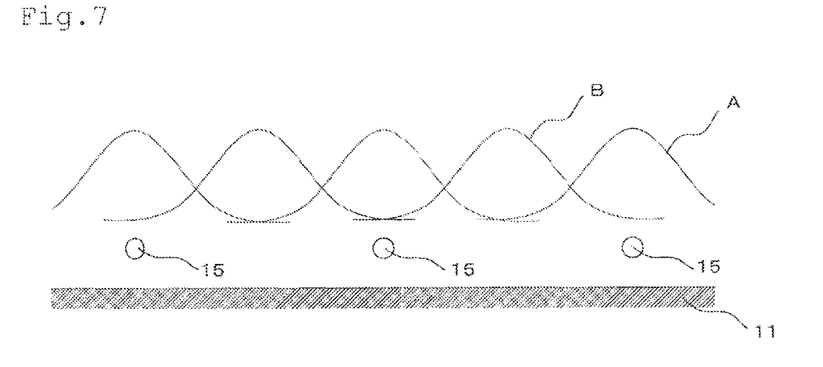
FIG. 7 is a schematic view for explaining the improvement in emission lines in one embodiment of the light quantity distribution of the reflected light from the light reflector of the invention.

Based on the obtained U15, U30 and U45 and according to the formula 2 and the formula 3, Q1 and Q2 can be obtained. The ratio of the denominator of Q1, $\tan(45°)-\tan(15°)$, to the denominator of Q2, $\tan(30°)-\tan(15°)$ is equal to the ratio of the distance between T15 and T45 of the diffuser and the distance between T15 and T30 thereof. Accordingly, Q1 indicates the mean light quantity increase from T15 to T45 of the diffuser; and Q2 indicates the mean light quantity increase from T15 to T30 of the diffuser. The position of the diffuser just above the light source is represented by T0, and FIG. 6(a) schematically shows the relationship between the distance from T0 (horizontal axis) and the light quantity (vertical axis). The tilt of the linear line q1 corresponds to Q1, and the tilt of the linear line q2 corresponds to Q2. Of the light reflector of the invention, the reflection angle light quantity ratio represented by Q2/Q1, Q falls from 1.5 to 6.5, and therefore, as shown in FIG. 6(a), the tilt of the linear line q2 is larger than the tilt of the linear line q1, and the line drawn by connecting the three points gives an upwardly-swelling mountain-like curve. FIG. 6(a) is a graph showing the result of measurement of the reflected light from the left-side light source; but in general, the same light source exists also on the right side, and preferably, the result of measurement of the reflected light from the right-side light source is added for evaluation. FIG. 6(b) is a graph in which the result of measurement of the reflected light from the right-side light source is additionally drawn. In this, T0' indicates the position of the light source on the right side. The two graphs are generally symmetric, and are similarly upwardly-swelling mountain-like curves. Accordingly, as shown in FIG. 7, the cumulative light quantity value at around T30 (nearly the center position between lamps) is larger than the cumulative light quantity value at around T15 and T45, and therefore the light reflector can sufficiently exhibit the emission line preventing effect and the effect of preventing brightness unevenness. In FIG. 7, A means the direct light component from the light source, and B means the integrated value of the reflected light components from multiple light sources.

The reflection angle light quantity ratio Q of the light reflector of the invention is preferably from 1.5 to 4.0, more preferably from 1.5 to 3.0. The reflection angle light quantity ratio Q of the light reflector of the invention can be set to fall from 1.55 to 2.5, and can be set to fall from 1.6 to 2.0. When the reflection angle light quantity ratio Q is less than 1.5, the distance between the light sources would be dark and emission lines would be thereby generated. On the contrary, when the reflection angle light quantity ratio Q is more than 6.5, then the position nearest to the light source would be dark and emission lines would be thereby generated.

If the light reflector has an ideal mirror face and can reflect the incident light at the reflection angle that is the same as the incident angle, then the line to be drawn by connecting the three lines in FIG. 6(a) could be a linear line, and the reflection angle light quantity ratio Q is 1 (Q1=Q2). Further, in the case where the light reflector is a diffusive light reflector and reflects the incident light in random directions, then the line to be drawn by connecting the three lines is to be a downwardly-depressing curve and the reflection angle light quantity ratio Q is less than 1 (Q1>Q2). Anyhow, in those cases, the area between lamps is dark and emission lines would be generated more.

As retroreflective members having the function of orienting light in one direction, prism sheets and hollow beads-coated sheets are well known. Though depending on the design thereof, in the case where these members are used, the reflection angle light quantity ratio Q would be more than 6.5. The light reflector of the invention is not to regulate or orient all the incident light through retroreflection, but is to gently regulate or orient only the light having reached the scale-like light reflecting section therein. Even a prism sheet or a hollow beads-coated sheet could be so controlled as to have the reflection angle light quantity ratio of not more than 6.5 by specifically controlling the ratio of the prisms and the hollow beads to be positioned on the surface thereof, for example, by positioning them as spaced from each other or by applying them sparsely to thereby specifically regulate the retroreflectivity thereof. However, as compared with such prism sheets or hollow beads-coated articles, the light reflector of the invention has many advantages in that the structure thereof is simple and easy to handle. Another advantage of the light reflector of the invention is that it is formed of almost the same member and therefore the material cost may can be reduced and the recyclability in its disposal is good.

In the formulae 1 to 6 for computing the reflection angle light quantity ratio Q in the invention, Tan(15°), Tan(30°), Tan(45°), Cos²(15°), Cos²(30°) and Cos²(45°) are all constants. Accordingly, in the invention, the reflection angle light quantity ratio Q and the found data S15, S30 and S45 can be collectively represented by one relational formula of the following formula (8):

Reflection Angle Light Quantity Ratio $Q=[(3+\sqrt{3})/2] \times [(3 \times S30-(2+\sqrt{3}) \times S15)/(2 \times S45-(2+\sqrt{3}) \times S15)]$ (8)

[Planar Light Source Device and Illuminating Device]

The planar light source device and the illuminating device of the invention each comprise the above-mentioned light reflector. Examples of the concrete constitution include an underlight-type backlight shown in FIG. 2 and a sidelight-type backlight shown in FIG. 3. The underlight-type backlight shown in FIG. 2 comprises a housing 11 that serves both as a profile case and as a light reflector, a diffuser 14, and a light source such as a cold-cathode lamp 15. The sidelight-type backlight shown in FIG. 3 comprises a light waveguide with a dot print 12 on a transparent acrylic plate 13, a light reflector 11, a diffuser 14, and a light source such as a cold-cathode lamp 15.

Preferably, the planar light source device and the illuminating device of the invention each have at least two linear light sources. More preferably, in these, at least two linear light sources are arranged at regular intervals, and even more preferably, at least two linear light sources both having the same length are arranged at regular intervals and in parallel to each other. Still more preferably, the point on the diffuser which the light from the linear light source reaches after having reflected on the surface of the light reflector at a reflection angle 30° is spaced from the neighboring linear light sources nearly by the same distance. Nearly the same distance as referred to herein means that the distance from one linear light source is within ±10% of the distance from the other linear light source, preferably within ±5%, more preferably within ±3%, even more preferably within ±1%. The distance between the neighboring light sources is generally from 20 to 30 mm, preferably from 21 to 28 mm. The distance between the light source and the light reflector is generally from 1 to 4 mm, preferably from 1.5 to 3.8 mm. The distance between the light reflector and the diffuser is generally from 13 to 21 mm, preferably from 18 to 21 mm.

The planar light source device as referred to herein includes backlights for liquid-crystal display devices such as liquid-crystal TVs, liquid-crystal monitors, etc., as well as backlights for illumination signboards, etc. The illuminating device as referred to herein means an illuminating device for household use that requires a reflector, including, for example, ceiling lights, down lights, base lights, kitchen lights, bracket lights, pendant lights, etc. The light reflector of the invention is usable for any other devices and members than those planar light source devices and illuminating devices.

EXAMPLES

Examples, Comparative Examples and Test Examples are given below, and the invention is described further concretely. The material used, its amount and the ratio, and the details of the treatment shown below may be suitably modified or changed not overstepping the spirit and the scope of the invention. Accordingly, the scope of the invention should not be limited by the following Examples. The materials used in Examples are shown in Table 1.

TABLE 1

| Ingredient | Details |
|---|---|
| PP1 | propylene homopolymer [Japan Polypropylene's Novatec (trade name) PP:EA8] MFR: 0.8 g/10 min (230° C., 2.16 kg load), melting point: 167° C. (DSC peak temperature) |
| PP2 | propylene homopolymer [Japan Polypropylene's Novatec (trade name) PP:MA4] MFR: 5 g/10 min (230° C., 2.16 kg load), melting point: 167° C. (DSC peak temperature) |
| PP3 | propylenic random copolymer [Japan Polypropylene's Novatec (trade name) PP:FW4BT] MFR: 6.5 g/10 min (230° C., 2.16 kg load), melting point: 139° C. (DSC peak temperature) |
| HDPE | high-density polyethylene [Japan Polyethylene's Novatec (trade name) HD:HJ360] MFR: 5.5 g/10 min (190° C., 2.16 kg load), melting point: 134° C. (DSC peak temperature) |
| Filler (a) | Talc (Fuji Talc Industry's LMP-100) mean particle size: 11 μm aspect ratio: 4 |
| Filler (b) | surface-treated precipitated calcium carbonate [Maruo Calcium's Calfine YM30] mean particle size: 0.3 μm aspect ratio: 1 |
| Filler (c) | heavy calcium carbonate [Bihoku Funka Kogyo's BF300] mean particle size: 8 μm aspect ratio: 1 |
| Filler (d) | titanium dioxide [Ishihara Sangyo's CR-60] mean particle size: 0.2 μm aspect ratio: 1 |
| Filler (e) | mica [Repco's Repco Mica M-325] mean particle size: 18 μm aspect ratio: 13 |

Examples 1, 4, 5, 8

The materials shown in Table 1 were mixed in the ratio as in Table 2 to prepare compositions (A) and (B), which were melt-kneaded at 250° C., using three separate extruders. Next, these were fed into one coextrusion die, in which the composition (A) and the composition (B) were laminated to be (B)/(A)/(B), which was then sheetwise extruded out and cooled to about 60° C. with a chill roll to prepare a laminate.

The laminate was reheated at 145° C., and then stretched to the draw ratio as in Table 2 in the lengthwise direction (machine direction, MD) thereof by utilizing the peripheral speed difference between a number of rolls.

Next, the laminate was reheated at 160° C., and then stretched to the draw ratio as in Table 2 in the lateral direction (cross direction, CD) thereof, using a tenter. Subsequently, this was annealed at 160° C., then cooled to 60° C., and its edges were trimmed away to give a three-layered multilayer film having the thickness as in Table 2. The multilayer film is used as a light reflector.

Example 2

The materials shown in Table 1 were mixed in the ratio as in Table 2 to prepare a composition (A), which was melt-kneaded in an extruder at 250° C. Next, this was sheetwise extruded out and cooled to about 60° C. with a chill roll to prepare an unstretched sheet (A) of the composition (A). The sheet was reheated at 145° C., and then stretched to the draw ratio as in Table 2 in the lengthwise direction thereof by utilizing the peripheral speed difference between a number of rolls, thereby giving a lengthwise-stretched sheet (A).

A composition (C) comprising PP2 shown in Table 1 was melt-kneaded in an extruder at 250° C., and the composition (c) was melt-extruded on both surfaces of the lengthwise-stretched sheet (A) prepared in the above, thereby giving a laminate of (C)/(A)/(C). Next, the laminate was reheated at 160° C., and stretched to the draw ratio as in Table 2 in the cross direction thereof in a tenter. Next, this was annealed at 160° C. and then cooled to 60° C., and its edges were trimmed away to give a three-layered multilayer film 1 having the thickness as in Table 2.

Next, a composition (B) prepared by blending the materials shown in Table 1 in the ratio as in Table 2 was melt-kneaded in an extruder at 250° C. Next, this was sheetwise extruded out, and cooled with a chill roll to about 60° C. to give an unstretched sheet (B). The unstretched sheet (B) was reheated at 145° C., and then stretched to the draw ratio as in Table 2 in the lengthwise direction thereof by utilizing the peripheral speed difference between a number of rolls, thereby giving a lengthwise-stretched sheet (B). Next, the lengthwise-stretched sheet (B) was reheated at 160° C. and stretched to the draw ratio as in Table 2 in the cross direction thereof in a tenter. Next, this was annealed at 160° C. and then cooled to 60° C., and its edges were trimmed away to give a biaxially-stretched film (B) having the thickness as in Table 2.

An adhesive, polyester-type anchor coating agent (Toyo Morton's AD-503) was applied on one surface of the multilayer film 1 in a coating amount of 4 g/m² (in terms of the solid content after dried), and after the solvent was evaporated away, the biaxially-stretched film (B) was stuck thereto to be (B)/(C)/(A)/(C), thereby giving a four-layered multilayer film. The multilayer film is used as a light reflector.

Example 3

The materials shown in Table 1 were mixed in the ratio as in Table 2 to prepare a composition (A), which was melt-kneaded in an extruder at 250° C. Next, this was sheetwise extruded out and cooled to about 60° C. with a chill roll to prepare an unstretched sheet (A) of the composition (A). The sheet was reheated at 145° C., and then stretched to the draw ratio as in Table 2 in the lengthwise direction thereof by utilizing the peripheral speed difference between a number of rolls, thereby giving a lengthwise-stretched sheet (A).

A composition (B) prepared by blending the materials shown in Table 1 in the ratio as in Table 2 was melt-kneaded in an extruder at 250° C., and the composition (B) was melt-extruded on both surfaces of the lengthwise-stretched sheet (A) prepared in the above to be (B)/(A)/(B). Next, the laminate was reheated at 160° C. and stretched in the cross direction in the ratio as in Table 2, using a tenter. Next, this was annealed at 160° C. and then cooled to 60° C., and its edges were trimmed away to give a three-layered multilayer film having the thickness as in Table 2.

Example 6

The materials shown in Table 1 were mixed in the ratio as in Table 2 to prepare compositions (A) and (B), which were melt-kneaded at 250° C., using three separate extruders. Next, these were fed into one coextrusion die, in which the composition (A) and the composition (B) were laminated to be (B)/(A)/(B), which was then sheetwise extruded out and cooled to about 60° C. with a chill roll to prepare a laminate.

The laminate was cut into a sheet having a square size of 100 mm length×100 mm width. Using a biaxial stretching tester (by Toyo Seiki Seisakusho), the sheet was reheated at 160° C., and then simultaneously biaxially stretched to the ratio shown in Table 2, then cooled with cold wind to 60° C., and its edges were trimmed away to give a three-layered multilayer film having the thickness as in Table 2. The multilayer film is used as a light reflector.

Example 7, Comparative Examples 1, 2

The materials shown in Table 1 were mixed in the ratio as in Table 2 to prepare a composition (A), which was melt-kneaded in an extruder at 250° C. Next, this was sheetwise extruded out and cooled to about 60° C. with a chill roll to prepare an unstretched sheet (A) of the composition (A). The sheet was reheated at 145° C., and then stretched to the draw ratio as in Table 2 in the lengthwise direction thereof by utilizing the peripheral speed difference between a number of rolls, thereby giving a lengthwise-stretched sheet (A).

The materials shown in Table 1 were mixed in the ratio as in Table 2 to prepare compositions (B) and (C), which were melt-kneaded at 250° C., using three separate extruders. These were melt-extruded onto both surfaces of the lengthwise-stretched sheet (A) prepared in the above to be (B)/(C)/(A)/(C). The laminate was reheated at 160° C. and stretched to the draw ratio as in Table 2 in the cross direction thereof in a tenter. Next, this was annealed at 160° C. and then cooled to 60° C., and its edges were trimmed away to give a four-layered multilayer film having the thickness as in Table 2. The multilayer film is used as a light reflector.

TABLE 2

| | Material Composition (% by weight) | | | | | | | | | | | Draw Ratio | | |
|---|---|---|---|---|---|---|---|---|---|---|---|---|---|---|
| | Substrate Layer (A) | | | Emission Line Preventing Layer (B) | | | | Interlayer (C) PP2 | Layer Thickness (µm) | Layer Constitution | machine direction MD | cross direction CD | Areal Ratio MD × CD |
| | PP1 | HDPE | filler | filler (d) | PP2 | PP3 | filler | filler (d) | | | | | | |
| Example 1 | 51 | 4 | 40(b) | 5 | 90 | — | 10(a) | — | — | 5/200/5 | B/A/B | 4.5 | 8.5 | 38.3 |
| Example 2 | 51 | 4 | 40(b) | 5 | 97 | — | 3(c) | — | 100 | 50/3/200/3 | B/C/A/C | 4.5 | 8.5 | 38.3 |
| Example 3 | 51 | 4 | 40(b) | 5 | 90 | — | 10(a) | — | — | 10/200/10 | B/A/B | 4.5 | 8.5 | 38.3 |
| Example 4 | 75 | — | 20(b) | 5 | 90 | — | 10(a) | — | — | 5/250/5 | B/A/B | 4.5 | 8.5 | 38.3 |
| Example 5 | 51 | 4 | 40(b) | 5 | 65 | — | 35(a) | — | — | 5/200/5 | B/A/B | 4.5 | 8.5 | 38.3 |
| Example 6 | 51 | 4 | 40(b) | 5 | 90 | — | 10(a) | — | — | 5/200/5 | B/A/B | 6 | 6 | 36.0 |
| Example 7 | 51 | 4 | 40(b) | 5 | — | 85 | 15(e) | — | 100 | 5/10/200/15 | B/C/A/C | 4 | 7 | 28.0 |
| Example 8 | 51 | 4 | 40(b) | 5 | — | 90 | 10(a) | — | — | 10/145/10 | B/A/B | 4.5 | 8.5 | 38.3 |
| Comparative Example 1 | 51 | 4 | 40(b) | 5 | 90 | — | 9(b) | 1 | 100 | 3/10/200/13 | B/C/A/C | 4.5 | 8.5 | 38.3 |

TABLE 2-continued

| | Material Composition (% by weight) | | | | | | | | | | Draw Ratio | | |
|---|---|---|---|---|---|---|---|---|---|---|---|---|---|
| | Substrate Layer (A) | | | | Emission Line Preventing Layer (B) | | | | Inter-layer | Layer | Layer | machine direction | cross direction | Areal Ratio |
| | PP1 | HDPE | filler | filler (d) | PP2 | PP3 | filler | filler (d) | (C) PP2 | Thickness (μm) | Constitution | MD | CD | MD × CD |
| Comparative Example 2 | 50 | 4 | 40(b) | 6 | 40 | — | 59(b) | 1 | 100 | 3/10/200/13 | B/C/A/C | 4.5 | 8.5 | 38.3 |

Evaluation Examples

Light Quantity at Reflection Angle 15°, 30°, 45°

Using an automatic goniophotometer (Murakami Shikisai Kenkyujo's GP200), the light reflectors produced in Examples and Comparative Examples were analyzed to determine the light quantity value at a light radiation angle of 15°, 30° or 45° and at a reflection angle (light receiving angle) of 15°, 30° or 45°, respectively. The found data of the light quantity are S15, S30 and S45.

From the data S15, S30 and S45 and according to the formulae 1 to 6, Q1, Q2 and Q, respectively, were obtained. The results are shown in Table 3.

Aspect Ratio of Scale-Like Light Reflecting Section:

The light reflectors produced in Examples and Comparative Examples were analyzed to determine the aspect ratio in the machine direction and in the cross direction in shaping.

The aspect ratio in the machine direction was obtained as follows: The vertical cross section in the thickness direction parallel to the machine direction of the emission line preventing layer (B) was observed with a scanning electronic microscope (Topcon's SM-200) at 1000 to 3000 magnifications. The size (maximum diameter, minimum diameter) of randomly selected 10 scale-like light reflecting sections was measured, and the data of the aspect ratio (maximum diameter/minimum diameter) of these 10 sections were averaged. The result A1 is shown in Table 3.

The aspect ratio in the cross direction was obtained as follows: The vertical cross section in the thickness direction parallel to the cross direction of the emission line preventing layer (B) was observed with a scanning electronic microscope (Topcon's SM-200) at 1000 to 3000 magnifications. The size (maximum diameter, minimum diameter) of randomly selected 10 scale-like light reflecting sections was measured, and the data of the aspect ratio (maximum diameter/minimum diameter) of these 10 sections were averaged. The result A2 is shown in Table 3.

Figure 2:
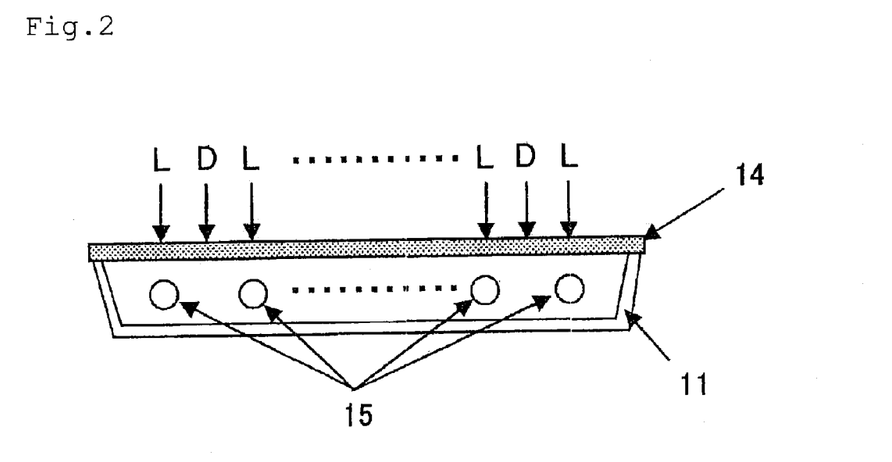
FIG. 2 is a cross-sectional view showing the constitution of an underlight-type backlight in which L is light and D is dark.
Figure 3:
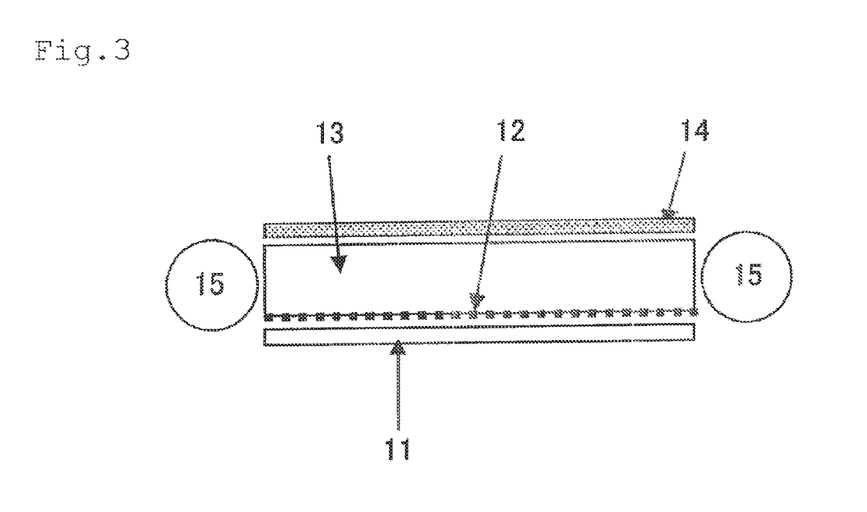
FIG. 3 is a cross-sectional view showing the constitution of a sidelight-type backlight.

Transmittance:

The light reflectors produced in Examples and Comparative Examples were analyzed to determine the light transmittance thereof at a wavelength of 550 nm, according to the method described in JIS-Z8722, condition-d and using a spectrophotometer (Hitachi's U-3310) equipped with an integrating sphere of φ150 mm. The result is shown in Table Emission Line Level:

At the position 11 of a 17-inch planar light source device having the structure shown in FIG. 2, the light reflector produced in Examples and Comparative Examples was set. The distance between the neighboring cold cathode lamps 15 was 24 mm. An inverter unit (by Harison) was connected to the cold cathode lamp 15, and a tube current of 12 V and 6 mA was applied to the cold cathode lamp 15 to put on the lamp for light emission. After 3 hours, the tested samples were evaluated as follows.

For measurement of the brightness, used was a luminance meter (Topcon's BM-7). The luminance meter was set in the normal direction to the planar light source device at the position of 50 cm as the distance between the luminance meter and the planar light source device, and while the luminance meter was horizontally moved in the direction perpendicular to the cold cathode lamp 15, the brightness was measured for a length of 100 mm at a pitch of 1 mm. From the found data of the brightness at each point, the brightness unevenness was obtained as "(maximum value−minimum value)/mean value", and the emission line generation level was determined according to the standards mentioned below. The result is shown in Table 3.

5: The brightness unevenness is less than 2.0, and the sample is good.

4: The brightness unevenness is from 2.0 to less than 2.5, and the sample is good.

3: The brightness unevenness is from 2.5 to less than 3.0, and the sample is good.

2: The brightness unevenness is from 3.0 to less than 3.5, and the sample is not good.

1: The brightness unevenness is from 3.5 or more, and the sample is not good.

Figure 8:
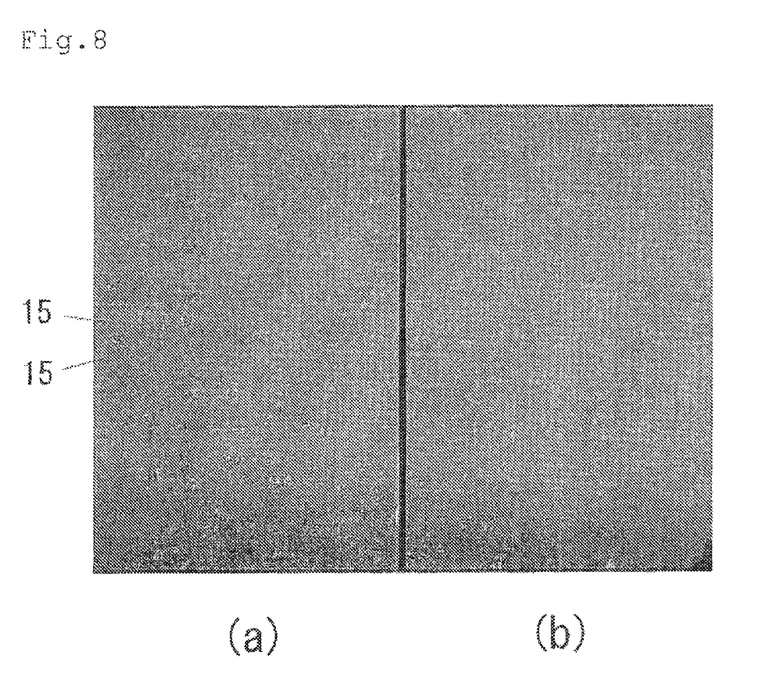
FIG. 8 includes photographic pictures showing the presence or absence of emission lines in Comparative Example 2 (picture a) and in Example 3 (picture b).

FIG. 8 includes photographic pictures showing the presence or absence of emission lines in Comparative Example 2 and in Example 3. In Comparative Example 2, emission lines are seen just above the light sources; but in Example 3, no emission line is seen.

TABLE 3

| | Scale-like Light Reflecting section Aspect Ratio | | 550 nm Light Transmittance | Porosity | Light Quantity at light receiving angle of 15°, 30°, 45° | | | Reflection Angle Light Quantity Ratio | | | Emission Line Level | Brightness Unevenness % |
|---|---|---|---|---|---|---|---|---|---|---|---|---|
| | A1 | A2 | (%) | (%) | U15 | U30 | U45 | Q1 | Q2 | Q | | |
| Example 1 | 16 | 35 | 1.6 | 50 | 780 | 1020 | 1100 | 437 | 776 | 1.77 | 5 | 1.0 |
| Example 2 | 4 | 9 | 1.5 | 46 | 190 | 262 | 288 | 133 | 232 | 1.74 | 5 | 1.1 |
| Example 3 | 4 | 35 | 1.6 | 46 | 94 | 125 | 141 | 64 | 101 | 1.59 | 3 | 2.9 |
| Example 4 | 16 | 35 | 1.8 | 40 | 850 | 1117 | 1210 | 492 | 863 | 1.75 | 5 | 1.1 |
| Example 5 | 16 | 35 | 1.6 | 50 | 510 | 658 | 720 | 287 | 478 | 1.67 | 4 | 2.2 |

TABLE 3-continued

|  | Scale-like Light Reflecting section Aspect Ratio | | 550 nm Light Transmittance | Porosity | Light Quantity at light receiving angle of 15°, 30°, 45° | | | Reflection Angle Light Quantity Ratio | | | Emission | Brightness |
|---|---|---|---|---|---|---|---|---|---|---|---|---|
|  | A1 | A2 | (%) | (%) | U15 | U30 | U45 | Q1 | Q2 | Q | Line Level | Unevenness % |
| Example 6 | 24 | 24 | 1.5 | 53 | 1030 | 1264 | 1320 | 396 | 756 | 1.91 | 5 | 0.9 |
| Example 7 | 40 | 90 | 1.3 | 65 | 680 | 1220 | 890 | 287 | 1745 | 6.08 | 5 | 0.9 |
| Example 8 | 4 | 35 | 2.0 | 46 | 94 | 125 | 141 | 64 | 101 | 1.59 | 3 | 2.9 |
| Comparative Example 1 | 1 | 9 | 1.6 | 46 | 99 | 108 | 114 | 21 | 31 | 1.46 | 2 | 3.4 |
| Comparative Example 2 | 1 | 9 | 1.5 | 46 | 30 | 43 | 54 | 33 | 43 | 1.33 | 1 | 4.4 |

INDUSTRIAL APPLICABILITY

Using the light reflector of the invention realizes a planar light source device free from a problem of brightness unevenness and free from generation of emission lines not changing the structure of the device itself, even in a planar light source device having multiple backlights for light emission (especially linear light source lamps such as cold cathode lamps) and heretofore often troubled by brightness unevenness owing to generation of emission lines. Accordingly, the industrial applicability of the invention is high.

The invention claimed is:

1. A light reflector comprising:
a multilayer film wherein the multilayer film comprises a substrate layer (A) and an emission line preventing layer (B) having a scale-like light reflecting section,
wherein the substrate layer (A) comprises a thermoplastic resin and a filler, a concentration of the filler in the substrate layer (A) is from 5 to 75% by weight, the filler comprises at least one of an inorganic filler having a mean particle size of from 0.05 to 1.5 μm and an organic filler having a mean dispersed particle size of from 0.05 to 1.5 μm,
the emission line preventing layer (B) comprises a thermoplastic resin and a filler, a concentration of the filler in the emission line preventing layer (B) is from 1 to 40% by weight, and the filler comprises at least one of an inorganic filler having a mean particle size of from 0.05 to 20 μm and an organic filler having a mean dispersed particle size of from 0.05 to 20 μm,
wherein the light reflector has a reflection angle light quantity ratio Q of 1.5 to 6.5, which is indicated by formula 1:

Reflection angle light quantity ratio $Q=Q2/Q1$ (Formula 1)

wherein Q1 and Q2 in the formula 1 each are indicated by formulae 2 and 3, respectively:

$Q1=[U45-U15]/[\text{Tan}(45°)-\text{Tan}(15°)]$ (Formula 2)

$Q2=[U30-U15]/[\text{Tan}(30°)-\text{Tan}(15°)]$ (Formula 3)

wherein U15, U30 and U45 in the formulae 2 and 3 each are indicated by formulae 4 to 6, respectively:

$U15=S15\times\text{Cos}^2(15°)$ (Formula 4)

$U30=S30\times\text{Cos}^2(30°)$ (Formula 5)

$U45=S45\times\text{Cos}^2(45°)$ (Formula 6)

wherein S15, S30 and S45 in the formulae 4 to 6 each represent a light quantity value as measured, when a light is applied from a light source placed at a position spaced from the light reflector to a side of the emission line preventing layer (B) of the light reflector, at a position on a path of the light as regularly reflected at a reflection angle of 15°, 30° or 45°, respectively, from the light reflector and spaced from a light reflection point by the same distance, and
the multilayer film has a porosity, as indicated by formula 7, which is from 30 to 70%:

Porosity (%)=$(\rho 0-\rho)/\rho 0\times 100$ (Formula 7)

wherein ρ0 in the formula 7 represents a true density of the multilayer film, and ρ in the formula 7 represents a density of the multilayer film.

2. The light reflector according to claim 1, wherein the scale-like light reflecting section has an aspect ratio of from 2 to 100 in any direction of a cross direction and a machine direction of the multilayer film.

3. The light reflector according to claim 1, wherein the multilayer film is a stretched film comprising a thermoplastic resin and a filler and stretched in an areal draw ratio of from 1.3 to 80 times.

4. The light reflector according to claim 3, wherein the thermoplastic resin is a polyolefin resin.

5. The light reflector according to claim 1, wherein the filler contained in the substrate layer (A) is a surface-treated inorganic filler.

6. The light reflector according to claim 1, wherein the filler contained in the emission line preventing layer (B) is an inorganic filler having an aspect ratio of from 1 to 80.

7. The light reflector according to claim 1, wherein the multilayer film has a light transmittance, as measured at a wavelength of 550 nm on the basis of JIS-Z-8722, which is from 0 to 2.5%.

8. The light reflector according to claim 1 for a planar light source device or an illuminating device having two or more linear light sources.

9. A planar light source device having two or more liner light sources, which comprises the light reflector of claim 1.

10. An illuminating device having two or more linear light sources, which comprises the light reflector of claim 1.

11. The light reflector according to claim 1, wherein the porosity of the multilayer film is from 30 to 54%.

12. The light reflector according to claim 1, wherein the porosity of the multilayer film is from 38 to 54%.

* * * * *